(12) United States Patent
Wu et al.

(10) Patent No.: US 12,541,130 B1
(45) Date of Patent: Feb. 3, 2026

(54) DISPLAY DEVICE AND BACKLIGHT MODULE

(71) Applicant: AmTRAN TECHNOLOGY CO., LTD, New Taipei (TW)

(72) Inventors: Chih-Cheng Wu, New Taipei (TW); Ruei-Chi Yuan, New Taipei (TW)

(73) Assignee: AmTRAN TECHNOLOGY CO., LTD, New Taipei (TW)

( * ) Notice: Subject to any disclaimer, the term of this patent is extended or adjusted under 35 U.S.C. 154(b) by 0 days.

(21) Appl. No.: 19/082,126

(22) Filed: Mar. 17, 2025

(30) Foreign Application Priority Data

Dec. 4, 2024 (TW) ................................ 113146971

(51) Int. Cl.
*G02F 1/13357* (2006.01)

(52) U.S. Cl.
CPC .. *G02F 1/133608* (2013.01); *G02F 1/133606* (2013.01)

(58) Field of Classification Search
CPC ......... G02F 1/133608; G02F 1/133606; G02F 1/133603
See application file for complete search history.

(56) References Cited

U.S. PATENT DOCUMENTS

| | | | | |
|---|---|---|---|---|
| 2002/0044437 A1* | 4/2002 | Lee | ................... | G02F 1/133604 362/581 |
| 2012/0002399 A1* | 1/2012 | Lai | .................... | G09F 13/0413 362/388 |
| 2012/0075551 A1* | 3/2012 | Kuromizu | ......... | G02F 1/133608 362/382 |
| 2013/0033658 A1* | 2/2013 | Kato | ................... | G02F 1/13452 349/60 |
| 2018/0246378 A1* | 8/2018 | Lee | ................... | G02F 1/133603 |
| 2021/0132432 A1* | 5/2021 | Sasaki | ................. | G02F 1/13332 |
| 2022/0214579 A1 | 7/2022 | Zhang | | |
| 2023/0324030 A1 | 10/2023 | Chiu | | |

FOREIGN PATENT DOCUMENTS

| | | | | |
|---|---|---|---|---|
| CN | 215769274 U | 2/2022 | | |
| CN | 218158628 U | 12/2022 | | |
| CN | 117492272 A | * 2/2024 | ....... | G02F 1/133608 |
| CN | 117518605 A | * 2/2024 | ....... | G02F 1/133608 |
| TW | 200742907 | 11/2007 | | |

* cited by examiner

Primary Examiner — Erin Kryukova
(74) Attorney, Agent, or Firm — Winston Hsu

(57) ABSTRACT

A display device includes a backlight module and a display panel disposed on the backlight module. The backlight module includes a back plate, a light board, a support pin, a cushion member and a diffuser. The light board is disposed on an inner surface of the back plate. The support pin includes a base and a support structure. The support structure protrudes from the base. The back plate and the light board are clamped between the base and the support structure. The cushion member is disposed at a top portion of the support structure. The diffuser is disposed above the light board and the back plate at a certain distance. The diffuser abuts against the cushion member. In an embodiment, the backlight module may include an elastic member sleeved on the support structure. Two ends of the elastic member respectively abut against the back plate and the base.

20 Claims, 6 Drawing Sheets

DISPLAY DEVICE AND BACKLIGHT MODULE

BACKGROUND OF THE INVENTION

1. Field of the Invention

The present invention relates to a display device and a backlight module and, more particularly, to a backlight module with a support pin capable of fixing a back plate and a light board, and a display device equipped with the backlight module.

2. Description of the Prior Art

In the designs of direct type backlight modules, a light board is usually fixed to a back plate by screws or adhesives, and a plurality of support pins are disposed between a diffuser and the light board to support the diffuser, so as to prevent the diffuser from deforming and affecting the light output of the backlight modules. However, a gap usually exists between the support pins and the diffuser due to manufacturing tolerance or assembly tolerance. When the backlight module suffers vibration or collision, the support pins may collide with the diffuser and generate abnormal noise, which is especially obvious when the backlight modules are used in automotive displays. Furthermore, the support pins are also easily detached from the light board by vibration or collision.

SUMMARY OF THE INVENTION

The present invention provides a backlight module with a support pin capable of fixing a back plate and a light board, and a display device equipped with the backlight module, so as to solve the aforesaid problems.

According to an embodiment of the present invention, a display device comprises a backlight module and a display panel. The display panel is disposed on the backlight module. The backlight module comprises a back plate, a light board, a support pin, a cushion member and a diffuser. The back plate has a first through hole. The first through hole extends through the back plate from an inner surface to an outer surface. The light board is disposed on the inner surface of the back plate. The light board has a second through hole extending through the light board. The first through hole is aligned with the second through hole. The support pin comprises a base and a support structure. The support structure protrudes from the base. The support structure passes through the first through hole and the second through hole, such that the back plate and the light board are clamped between the base and the support structure. The cushion member is disposed at a top portion of the support structure. The diffuser is disposed above the light board and the back plate at a certain distance. The diffuser abuts against the cushion member.

In an embodiment, the support structure comprises a plurality of resilient arms, and the cushion member is fixed by the plurality of resilient arms.

In an embodiment, each of the plurality of resilient arms has a first restraining portion, the cushion member has a second restraining portion, and the first restraining portion engages with the second restraining portion to restrain movement and deformation range of the cushion member.

In an embodiment, each of the plurality of resilient arms has an inclined surface and the inclined surface abuts against the light board.

In an embodiment, the cushion member has a rounded head and the diffuser abuts against the rounded head.

In an embodiment, the back plate has a first accommodating recess and the base is accommodated in the first accommodating recess.

In an embodiment, the base has a positioning structure, a periphery of the first accommodating recess is formed with a positioning recess, and the positioning structure engages with the positioning recess.

In an embodiment, the backlight module further comprises an elastic member, the back plate has a second accommodating recess, the second accommodating recess is located between the first through hole and the first accommodating recess, the elastic member is sleeved on the support structure and located in the second accommodating recess, and two ends of the elastic member respectively abut against the outer surface of the back plate and the base.

In an embodiment, the base has a positioning recess, a periphery of the first accommodating recess is formed with a positioning structure, and the positioning structure engages with the positioning recess.

According to an embodiment of the present invention, a backlight module comprises a back plate, a light board, a support pin and an elastic member. The back plate has a first through hole. The first through hole extends through the back plate from an inner surface to an outer surface. The light board is disposed on the inner surface of the back plate. The light board has a second through hole extending through the light board. The first through hole is aligned with the second through hole. The support pin comprises a base and a support structure. The support structure protrudes from the base. The support structure passes through the first through hole and the second through hole, such that the back plate and the light board are clamped between the base and the support structure. The elastic member is sleeved on the support structure. Two ends of the elastic member respectively abut against the outer surface of the back plate and the base.

In an embodiment, the backlight module further comprises a cushion member and a diffuser. The cushion member is disposed at a top portion of the support structure. The diffuser is disposed above the light board and the back plate at a certain distance. The diffuser abuts against the cushion member.

In an embodiment, the cushion member has a rounded head and the diffuser abuts against the rounded head.

In an embodiment, the support structure comprises a plurality of resilient arms, and a cushion member is fixed by the resilient arms.

In an embodiment, the back plate has a first accommodating recess and the base is accommodated in the first accommodating recess.

According to an embodiment of the present invention, a display device comprises a display panel and a backlight module. The display panel is disposed on the backlight module. The backlight module comprises a back plate, a support pin, a cushion member and a diffuser. The back plate has a first through hole and a first accommodating recess. The first through hole extends through the back plate from an inner surface to an outer surface. The first through hole connects the first accommodating recess. The support pin comprises a base and a support structure. The support structure protrudes from the base. The support structure passes through the first through hole. The base is accommodated in the first accommodating recess. The cushion member is disposed at a top portion of the support structure.

The diffuser is disposed above the light board and the back plate at a certain distance. The diffuser abuts against the cushion member.

In an embodiment, the display device further comprises a light board disposed on the inner surface of the back plate. The light board has a second through hole extending through the light board. The first through hole is aligned with the second through hole. The back plate and the light board are clamped between the base and the support structure of the support pin, and the support structure of the support pin passes through the first through hole and the second through hole.

In an embodiment, the base has a positioning structure, a periphery of the first accommodating recess is formed with a positioning recess, and the positioning structure engages with the positioning recess.

In an embodiment, the backlight module further comprises an elastic member, the back plate has a second accommodating recess, the second accommodating recess is located between the first through hole and the first accommodating recess, the elastic member is sleeved on the support structure and located in the second accommodating recess, and two ends of the elastic member respectively abut against the outer surface of the back plate and the base.

In an embodiment, the base has a positioning recess, a periphery of the first accommodating recess is formed with a positioning structure, and the positioning structure engages with the positioning recess.

In an embodiment, the cushion member has a rounded head and the diffuser abuts against the rounded head.

As mentioned in the above, the present invention utilizes the base and the support structure of the support pin to clamp the back plate and the light board, such that the support pin has the function of supporting the diffuser and fixing the light board at the same time. Accordingly, the screws required to install the light board or the support pin can be omitted to reduce manufacturing cost and assembly time. In an embodiment, the cushion member may be fixed at the top portion of the support structure. When the backlight module suffers vibration or collision, the cushion member can provide collision cushion between the support pin and the diffuser, thereby avoiding the abnormal noise. In an embodiment, the elastic member may be sleeved on the support structure, wherein two ends of the elastic member respectively abut against the outer surface of the back plate and the base. The elastic member can provide an elastic force to strengthen the clamping force of the support pin to the back plate and the light board, thereby preventing the support pin from loosening and shaking and causing abnormal noise.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
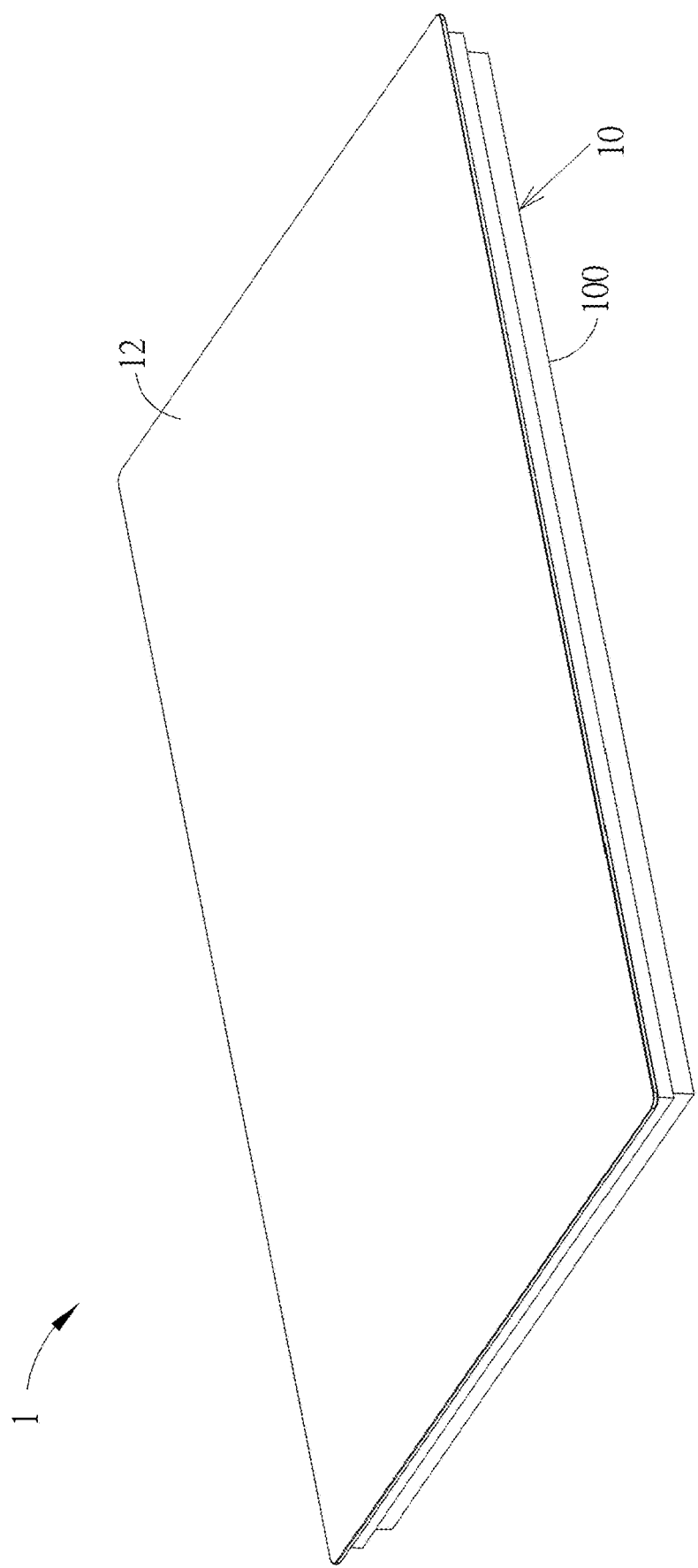
FIG. 1 is a perspective view illustrating a display device according to an embodiment of the present invention.
Figure 2:
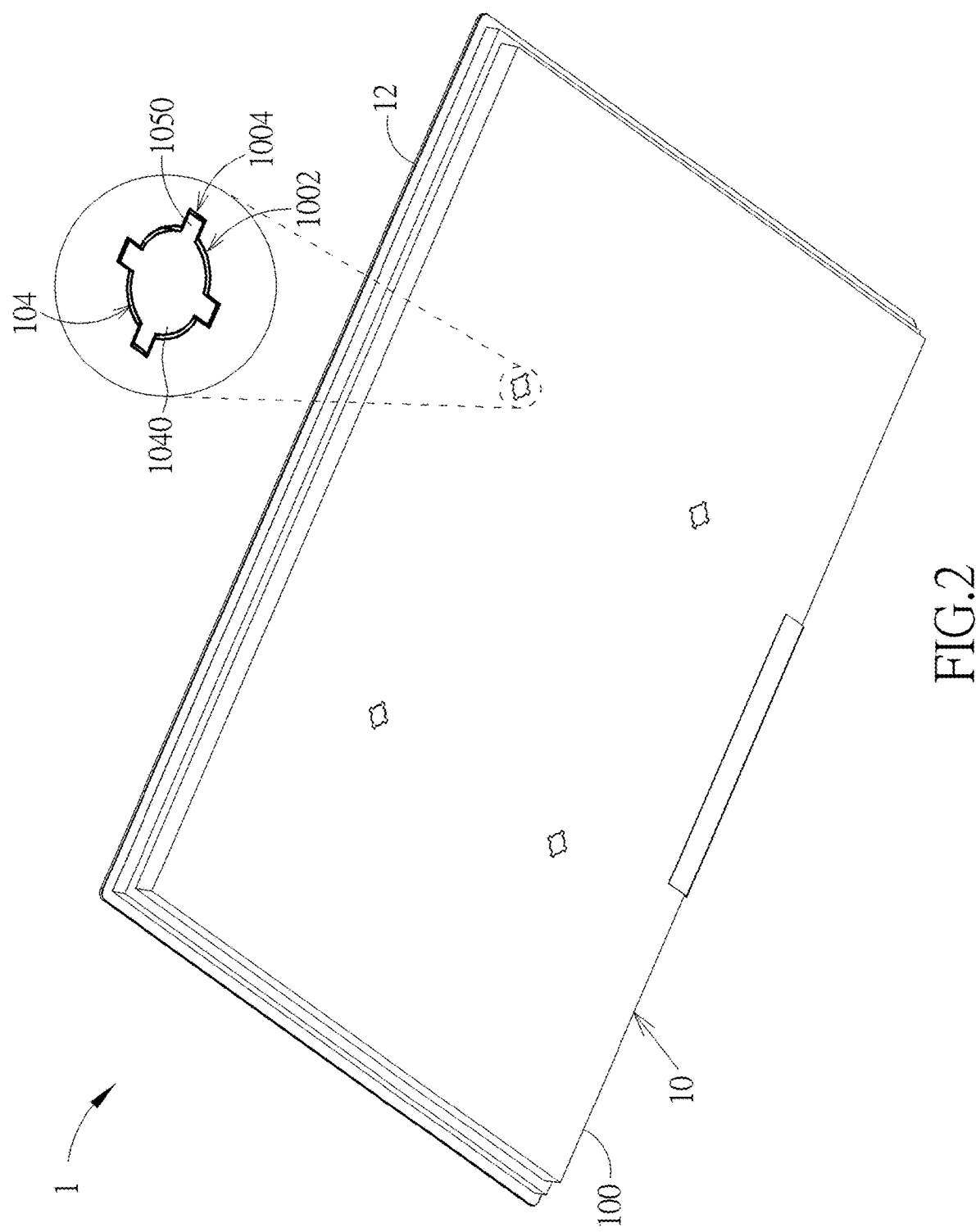
FIG. 2 is a perspective view illustrating the back plate of the display device from another viewing angle according to an embodiment of the present invention.
Figure 3:
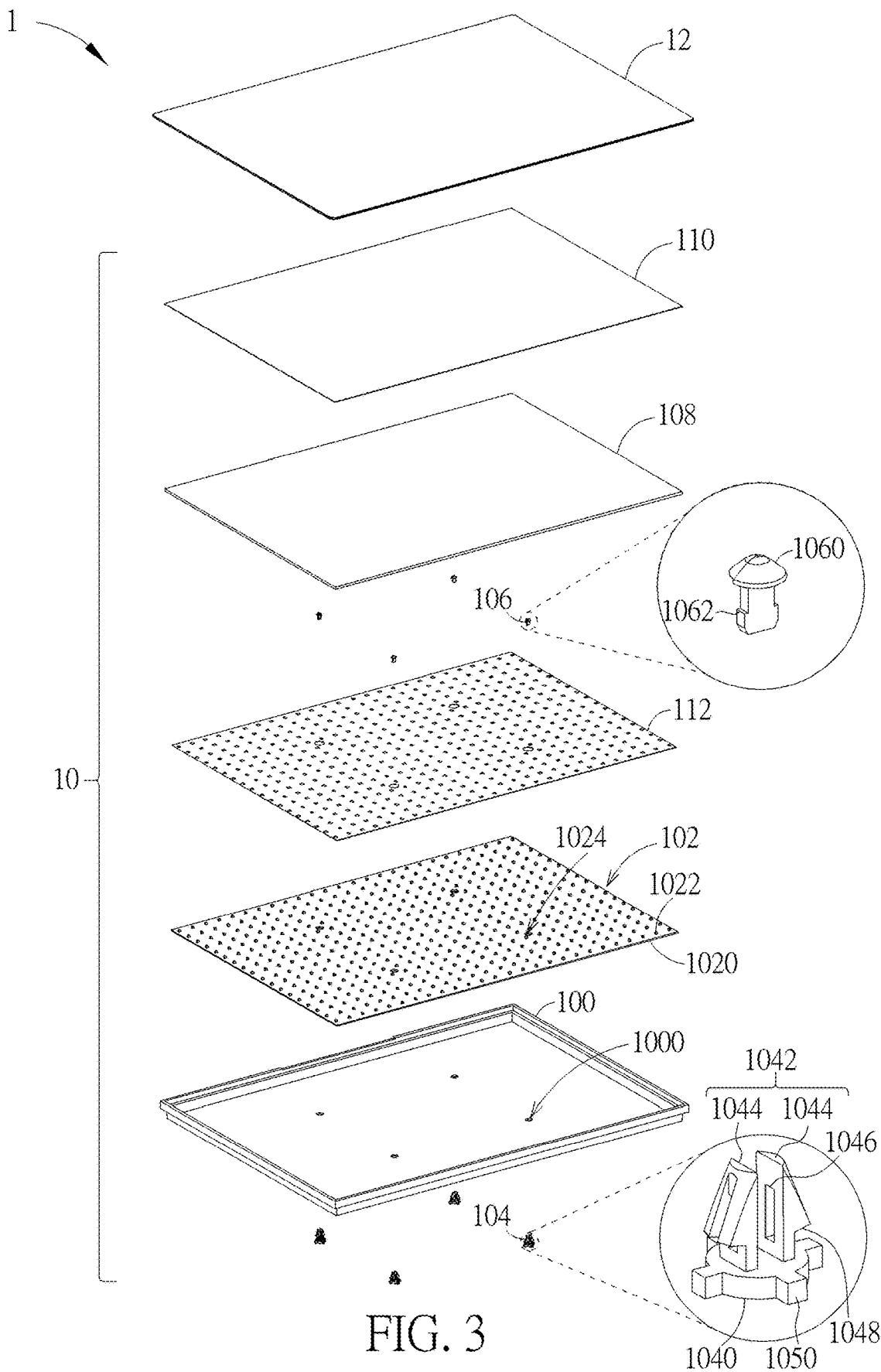
FIG. 3 is an exploded view illustrating the display device according to an embodiment of the present invention.
Figure 4:
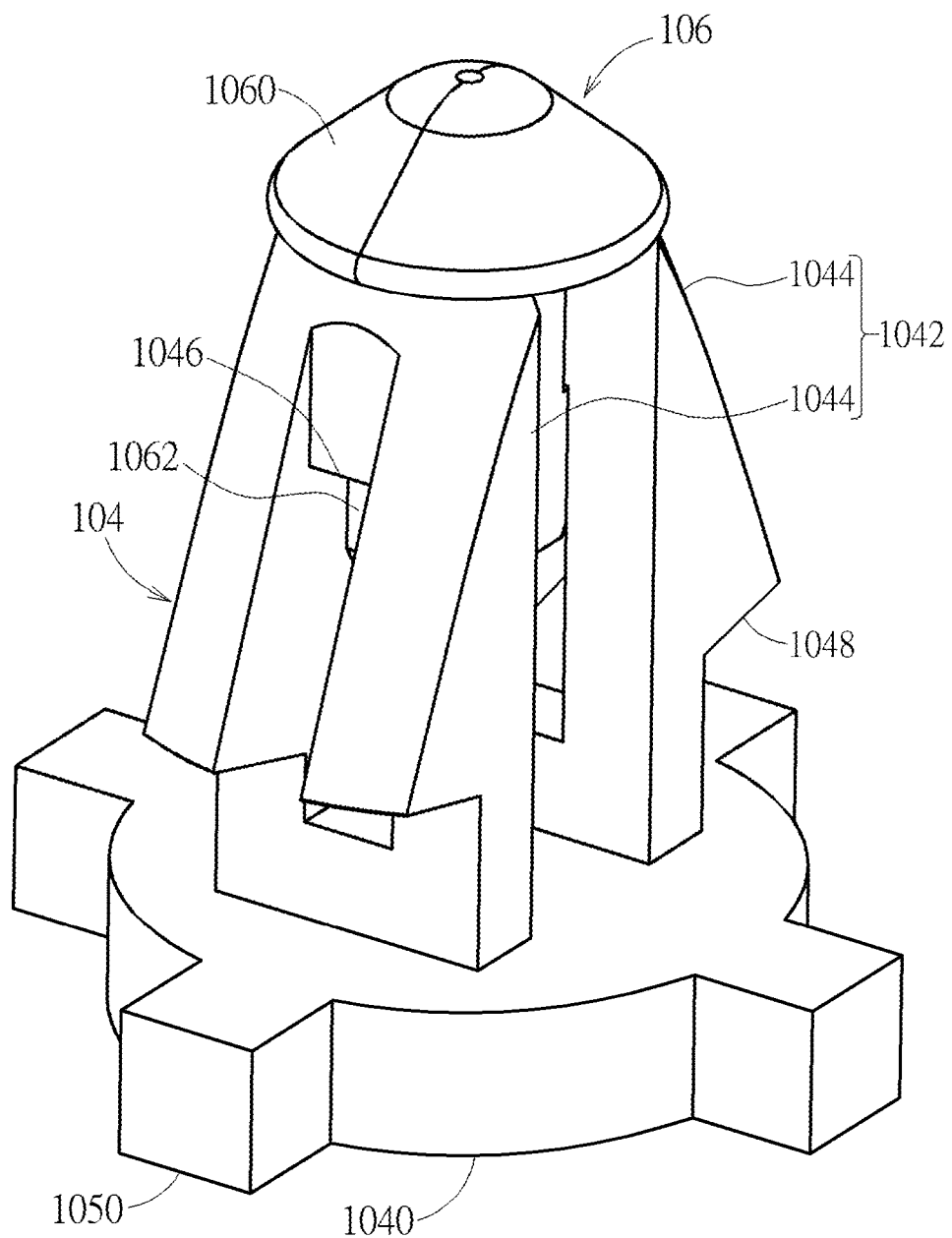
FIG. 4 is a perspective view illustrating the assembly of a support pin and a cushion member according to an embodiment of the present invention.
Figure 5:
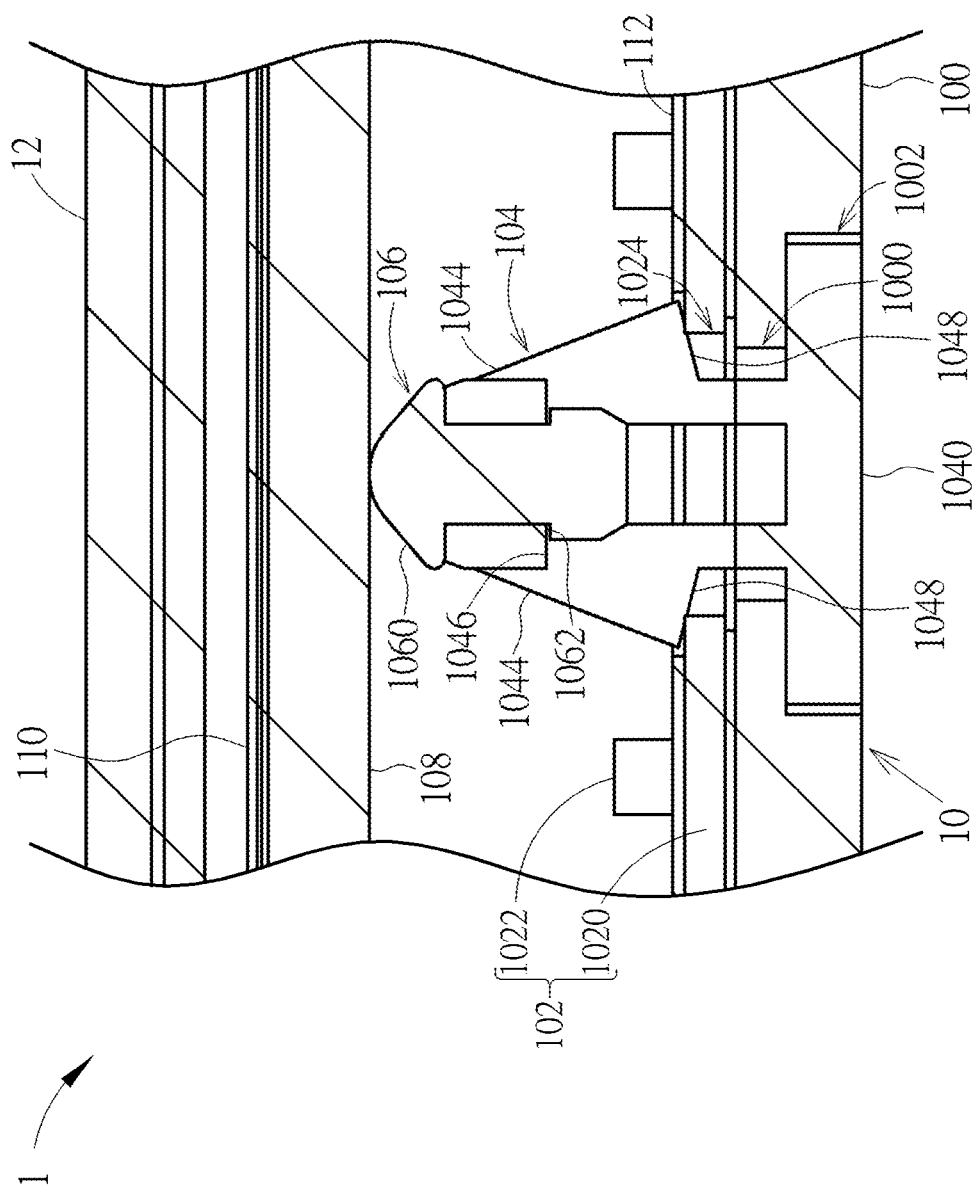
FIG. 5 is a partial sectional view illustrating the display device according to an embodiment of the present invention.

Referring to FIGS. 1 to 5, FIG. 1 is a perspective view illustrating a display device 1 according to an embodiment of the present invention, FIG. 2 is a perspective view illustrating the back plate 100 of the display device 1 from another viewing angle according to an embodiment of the present invention, FIG. 3 is an exploded view illustrating the display device 1 according to an embodiment of the present invention, FIG. 4 is a perspective view illustrating the assembly of a support pin 104 and a cushion member 106 according to an embodiment of the present invention, and FIG. 5 is a partial sectional view illustrating the display device 1 according to an embodiment of the present invention.

As shown in FIGS. 1 to 3, the display device 1 comprises a backlight module 10 and a display panel 12. The display panel 12 is disposed on the backlight module 10. In practical applications, the display panel 12 may be, but is not limited to, a liquid crystal display panel. The display device 1 utilizes the backlight module 10 to provide light to the display panel 12 for displaying images.

The backlight module 10 comprises a back plate 100, a light board 102, a support pin 104, a cushion member 106, a diffuser 108 and at least one optical film 110. In one embodiment, the backlight module 10 may be, but not limited to, a direct type backlight module. For example, the light board 102 may be disposed on an inner surface of the back plate 100 facing the display panel 12. The light board 102 may comprise a circuit board 1020 and a plurality of light emitting units 1022, wherein the light emitting units 1022 are disposed on the circuit board 1020. The light emitting unit 1022 may be, but not limited to, a sub-millimeter light emitting diode (mini LED). The diffuser 108 is disposed above the light board 102 and the back plate 100 at a certain distance, and the at least one optical film 110 is disposed on the diffuser 108. The at least one optical film 110 may comprise a brightness enhancement film (BEF), a prism sheet, a diffusion n sheet, and etc. according to practical applications. Furthermore, a reflective sheet 112, a reflective component or a reflective coating layer may be disposed on the circuit board 1020 to reflect light toward the diffuser 108.

In an embodiment of the present invention, the back plate 100 has a first through hole 1000 and the light board 102 has a second through hole 1024, wherein the first through hole 1000 extends through the back plate 100 from an inner surface to an outer surface, and the second through hole 1024 extends through the light board 102 and is aligned with the first through hole 1000. Furthermore, the support pin 104 comprises a base 1040 and a support structure 1042, wherein the support structure 1042 protrudes from the base 1040 and part of the structure has elasticity to deform and recover its shape. The support pin 104 may be made of a temperature resistant material to accommodate the temperature fluctuations in automotive environments. The surface of the support structure 1042 may be light reflective or coated with a light reflective layer. When installing the support pin 104, the support structure 1042 passes through the first through hole 1000 and the second through hole 1024 from the outer surface of the back plate 100. Since the base 1040 and the support structure 1042 of the support pin 104 are wider than the first through hole 1000 and the second through hole 1024, the back plate 100 and the light board 102 are clamped between the base 1040 and the support structure 1042 of the support pin 104 once the support pin 104 is installed, as shown in FIG. 5. Accordingly, the support pin 104 can secure or restrain the positions of the back plate 100 and the light board 102. It should be noted that the numbers of the support pins 104, the first through holes 1000 and the second through holes 1024 correspond to each other and may be determined according to practical applications, so the present invention is not limited to the embodiments shown in the figures.

In an embodiment of the present invention, the cushion member 106 is fixed or disposed at a top portion of the support structure 1042. During the assembly of the backlight module 10, the diffuser 108 is disposed above the back plate 100 and abuts against the cushion member 106. The cushion member 106 may be made of a soft material and has elasticity capable of being compressed and restored. In an embodiment of the present invention, the soft material used to make the cushion member 106 may be silicone, rubber or other soft materials, and may have light reflective, light diffusing, or light transmitting properties. For example, the soft materials may be mixed with light reflecting or light diffusing particles according to practical applications. As shown in FIG. 5, since the cushion member 106 is fixed at the top portion of the support structure 1042, the diffuser 108 abuts against the cushion member 106. When the display device 1 suffers shaking, vibration or collision, the cushion member 106 serves as a buffer between the support pin 104 and the diffuser 108, thereby avoiding the abnormal noise generated or protecting the surface of the diffuser 108 to be damaged.

In an embodiment of the present invention, the top portion of the cushion member 106 may have a rounded head 1060. The diffuser 108 may abut against the rounded head 1060. The rounded head 1060 can reduce the contact area between the cushion member 106 and the diffuser 108, thereby preventing the excessive contact area from affecting the optical performance. At the same time, when the support pin 104 collides with the diffuser 108, the rounded head 1060 functions as a buffer that absorbs the impact force and is deformed by downward pressure, and then recovers to the rounded shape through elasticity.

In an embodiment of the present invention, the support structure 1042 of the support pin 104 may comprise a plurality of resilient arms 1044, and the cushion member 106 is fixed by the plurality of resilient arms 1044. For example, the support structure 1042 of the support pin 104 may comprise two resilient arms 1044, wherein the two resilient arms 1044 are arranged opposite to each other and have partial elasticity. Each of the two resilient arms 1044 has a first restraining portion 1046 and an inclined surface 1048. Both sides of the lower portion of the cushion member 106 have a second restraining portion respectively. The second restraining portions 1062 are engaged or interlocked correspondingly with the first restraining portion 1046.

In an embodiment of the present invention, during the assembly of the backlight module 10, the light board 102 is first disposed on the inner surface of the back plate 100, and the first through hole 1000 is aligned with the second through hole 1024. Then, the two resilient arms 1044 of the support pin 104 are inserted into the first through hole 1000 and the second through hole 1024 from the outer surface of the back plate 100. At this step, the two resilient arms 1044 are pressed by the first through hole 1000 and the second through hole 1024 and elastically deformed inwardly. Once the inclined surfaces 1048 of the two resilient arms 1044 pass through the second through hole 1024, the two resilient arms 1044 will rebound outwardly and recover to original positions. Consequently, the inclined surfaces 1048 of the two resilient arms 1044 will abut against the light board 102 on the inner surface of the back plate 100 and the base 1040 will abut against the outer surface of the back plate 100, such that the back plate 100 and the light board 102 are clamped between the base 1040 and the support structure 1042 of the support pin 104, as shown in FIG. 5. Subsequently, the lower portion of the cushion member 106 is inserted into the space between the two resilient arms 1044. At this step, the two resilient arms 1044 may elastically deform outwardly to accommodate the lower portion of the cushion member 106. After the second restraining portions 1062 of the lower portion of the cushion member 106 passes through the first restraining portions 1046, the first restraining portions 1046 engage with the second restraining portions 1062, thereby restraining the cushion member 106 from moving, and the two resilient arms 1044 rebound inwardly and recover to original positions. Accordingly, the cushion member 106 can be firmly clamped between the two resilient arms 1044, and the rounded head 1060 abuts against the tops of the two resilient arms 1044. In an embodiment of the present invention, the second restraining portions 1062 of the cushion member 106 are engaging lugs, and the first restraining portions 1046 of the two resilient arms 1044 are engaging slots, wherein the two restraining portions are configured to tightly interlock. However, the present invention is not limited this. For example, the second restraining portions 1062 may be engaging slots, and the first restraining portions 1046 may be engaging hooks. In addition, the two restraining portions may be other engaging, jointing or fixing structures.

As shown in FIGS. 2 and 5, in an embodiment of the present invention, the first through hole 1000 of the back plate 100 may be connected to a first accommodating recess 1002. The first accommodating recess 1002 is located at the outer surface of the back plate 100. The base 1040 of the support pin 104 may be housed or fitted into the first accommodating recess 1002 and abuts against the outer surface of the back plate 100 within the first accommodating recess 1002, so as to prevent the base 1040 from protruding excessively outside the back plate 100. In an embodiment of the present invention, the base 1040 may have a positioning structure 1050 and a periphery of the first accommodating recess 1002 may be formed with a positioning recess 1004. When the base 1040 is accommodated in the first accommodating recess 1002 and abuts against the outer surface of the back plate 100 within the first accommodating recess 1002, the positioning structure 1050 engages with the positioning recess 1004 to restrain the support pin 104 from moving and rotating. The bottom surface of the base 1040 is coplanar with the outer surface of the back plate 100. It should be noted that the numbers of the positioning structures 1050 and the positioning recesses 1004 correspond to each other and may be determined according to practical applications, so the present invention is not limited to the embodiments shown in the figures. For example, in another embodiment of the present invention, the base 1040 may have the positioning recess 1004, the periphery of the first accommodating recess 1002 may be formed with the positioning structure 1050, and the positioning structure 1050 may still engage with the positioning recess 1004.

Figure 6:
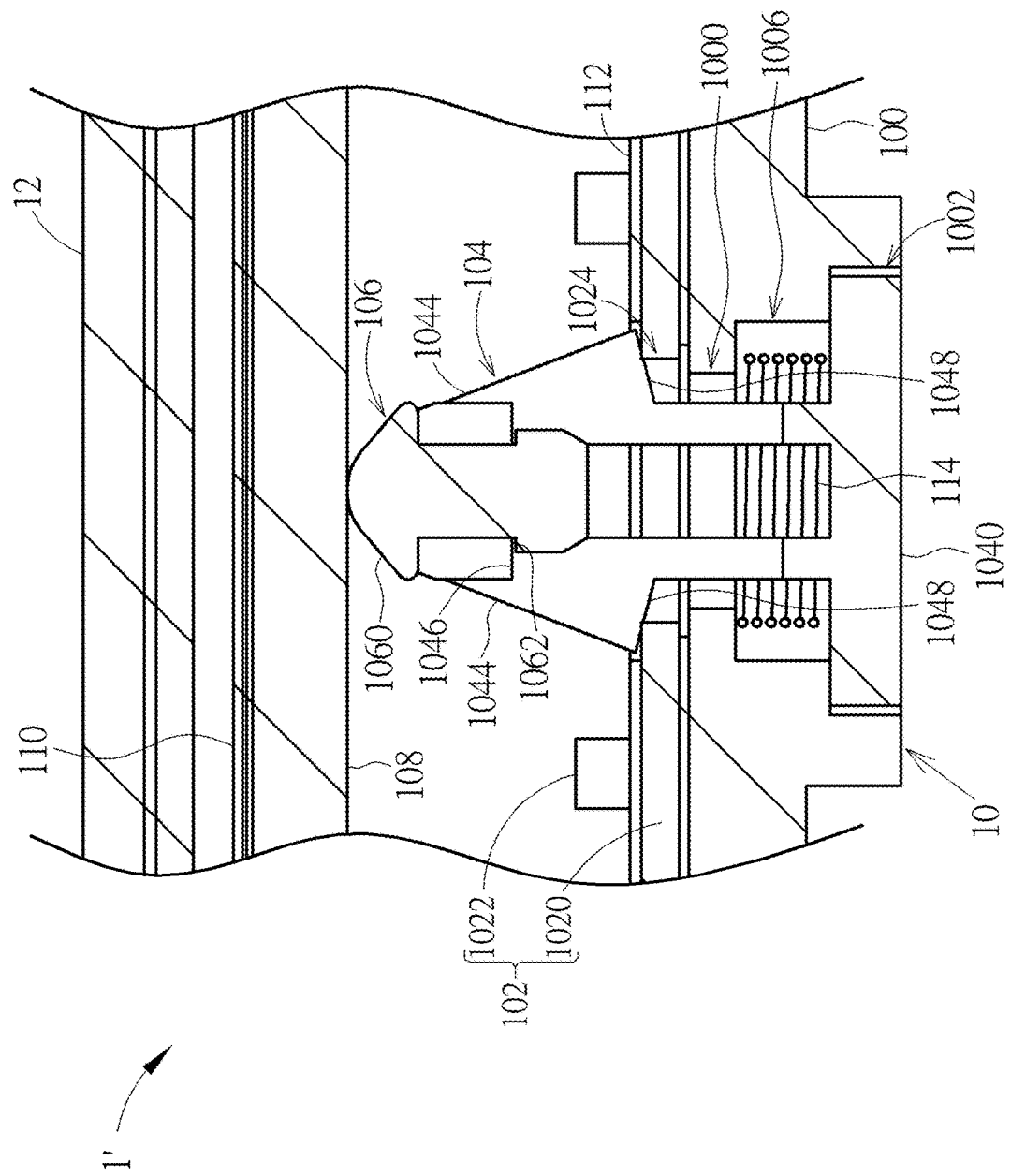
FIG. 6 is a partial sectional view illustrating a display device according to an embodiment of the present invention.

Referring to FIG. 6, FIG. 6 is a partial sectional view illustrating a display device 1' according to an embodiment of the present invention.

The main difference between the display device 1' and the aforesaid display device 1 is that the backlight module 10 of the display device 1' further comprises an elastic member 114, and the elastic member 114 contacts the outer surface of the back plate 100 instead of the base 1040, as shown in FIG. 6. In an embodiment of the present invention, the back plate 100 further has a second accommodating recess 1006, wherein the second accommodating recess 1006 is located between the first through hole 1000 and the first accommodating recess 1002. The elastic member 114 is sleeved on the support structure 1042 of the support pin 104 and located in the second accommodating recess 1006, such that two ends of the elastic member 114 in the second accommodating recess 1006 respectively abut against the outer surface of the back plate 100 and the base 1040 of the support pin 104. The elastic member 114 can provide an elastic force to strengthen the clamping force of the support pin 104 on both the back plate 100 and the light board 102, thereby preventing the support pin 104 from loosening and shaking and causing abnormal noise. In an embodiment of the present invention, the elastic member 144 may be, but not limited to, a compression spring. Furthermore, the second accommodating recess 1006 may have a different shape from the first accommodating recess 1002, or the first accommodating recess 1002 on the back plate 100 extends inward to simultaneously accommodate the base 1040 of the support pin 104 and the elastic member 114.

As mentioned in the above, the present invention utilizes the base and the support structure of the support pin to clamp the back plate and the light board, such that the support pin has the function of supporting the diffuser and fixing the light board at the same time. Accordingly, the screws required to install the light board or the support pin can be omitted to reduce manufacturing cost and assembly time. In an embodiment, the cushion member may be fixed at the top portion of the support structure. When the backlight module suffers vibration or collision, the cushion member can serve as a buffer between the support pin and the diffuser, thereby avoiding the abnormal noise. In an embodiment, the elastic member may be sleeved on the support structure, wherein two ends of the elastic member respectively abut against the outer surface of the back plate and the base. The elastic member can provide an elastic force to strengthen the clamping force of the support pin to the back plate and the light board, thereby preventing the support pin from loosening and shaking and causing abnormal noise.

Those skilled in the art will readily observe that numerous modifications and alterations of the device and method may be made while retaining the teachings of the present invention. Accordingly, the above disclosure should be construed as limited only by the metes and bounds of the appended claims.

What is claimed is:

1. A display device comprising:
a display panel; and
a backlight module, the display panel being disposed on the backlight module, the backlight module comprising:
a back plate having a first through hole, the first through hole extending through the back plate from an inner surface to an outer surface;
a light board disposed on the inner surface of the back plate, the light board having a second through hole extending through the light board, the first through hole being aligned with the second through hole;
a support pin comprising a base and a support structure, the support structure protruding from the base, the support structure passing through the first through hole and the second through hole from the outer surface of the back plate, such that the back plate and the light board are clamped between the base and the support structure;
a cushion member disposed at a top portion of the support structure; and
a diffuser disposed above the light board and the back plate at a certain distance, the diffuser abutting against the cushion member.

2. The display device of claim 1, wherein the support structure comprises a plurality of resilient arms, and the cushion member is fixed by the plurality of resilient arms.

3. The display device of claim 2, wherein each of the plurality of resilient arms has a first restraining portion, the cushion member has a second restraining portion, and the first restraining portion engages with the second restraining portion to restrain movement and deformation range of the cushion member.

4. The display device of claim 2, wherein each of the plurality of resilient arms has an inclined surface and the inclined surface abuts against the light board.

5. The display device of claim 1, wherein the cushion member has a rounded head and the diffuser abuts against the rounded head.

6. The display device of claim 1, wherein the back plate has a first accommodating recess and the base is accommodated in the first accommodating recess.

7. The display device of claim 6, wherein the base has a positioning structure, a periphery of the first accommodating recess is formed with a positioning recess, and the positioning structure engages with the positioning recess.

8. The display device of claim 6, wherein the backlight module further comprises an elastic member, the back plate has a second accommodating recess, the second accommodating recess is located between the first through hole and the first accommodating recess, the elastic member is sleeved on the support structure and located in the second accommodating recess, and two ends of the elastic member respectively abut against the outer surface of the back plate and the base.

9. The display device of claim 6, wherein the base has a positioning recess, a periphery of the first accommodating recess is formed with a positioning structure, and the positioning structure engages with the positioning recess.

10. A backlight module comprising:
a back plate having a first through hole, the first through hole extending through the back plate from an inner surface to an outer surface;
a light board disposed on the inner surface of the back plate, the light board having a second through hole extending through the light board, the first through hole being aligned with the second through hole;
a support pin comprising a base and a support structure, the support structure protruding from the base, the support structure passing through the first through hole and the second through hole, such that the back plate and the light board are clamped between the base and the support structure; and
an elastic member sleeved on the support structure, two ends of the elastic member respectively abutting against the outer surface of the back plate and the base.

11. The backlight module of claim 10, further comprising:
a cushion member disposed at a top portion of the support structure; and a diffuser disposed above the light board and the back plate at a certain distance, the diffuser abutting against the cushion member.

12. The backlight module of claim 11, wherein the cushion member has a rounded head and the diffuser abuts against the rounded head.

13. The backlight module of claim 10, wherein the support structure comprises a plurality of resilient arms, and a cushion member is fixed by the resilient arms.

14. The backlight module of claim 10, wherein the back plate has a first accommodating recess and the base is accommodated in the first accommodating recess.

15. A display device comprising:
a display panel; and
a backlight module, the display panel being disposed on the backlight module, the backlight module comprising:
   a back plate having a first through hole and a first accommodating recess, the first through hole extending through the back plate from an inner surface to an outer surface, the first through hole connecting the first accommodating recess;
   a support pin comprising a base and a support structure, the support structure protruding from the base, the support structure passing through the first through hole from the first accommodating recess of the back plate, the base being accommodated in the first accommodating recess;
   a cushion member disposed at a top portion of the support structure; and
   a diffuser disposed above the back plate, the diffuser abutting against the cushion member.

16. The display device of claim 15, further comprising:
a light board disposed on the inner surface of the back plate, the light board having a second through hole extending through the light board, the first through hole being aligned with the second through hole;
wherein the back plate and the light board are clamped between the base and the support structure of the support pin, and the support structure of the support pin passes through the first through hole and the second through hole.

17. The display device of claim 15, wherein the base has a positioning structure, a periphery of the first accommodating recess is formed with a positioning recess, and the positioning structure engages with the positioning recess.

18. The display device of claim 15, wherein the backlight module further comprises an elastic member, the back plate has a second accommodating recess, the second accommodating recess is located between the first through hole and the first accommodating recess, the elastic member is sleeved on the support structure and located in the second accommodating recess, and two ends of the elastic member respectively abut against the outer surface of the back plate and the base.

19. The display device of claim 15, wherein the base has a positioning recess, a periphery of the first accommodating recess is formed with a positioning structure, and the positioning structure engages with the positioning recess.

20. The display device of claim 15, wherein the cushion member has a rounded head and the diffuser abuts against the rounded head.

* * * * *